(12) United States Patent
Park et al.

(10) Patent No.: US 10,399,242 B2
(45) Date of Patent: Sep. 3, 2019

(54) APPARATUS AND METHOD FOR CONTROLLING CAPTURE OF IMAGE OF CUT SURFACE

(71) Applicant: Electronics and Telecommunications Research Institute, Daejeon (KR)

(72) Inventors: Nam-Shik Park, Daejeon (KR); Hyo-Bong Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 240 days.

(21) Appl. No.: 15/335,950

(22) Filed: Oct. 27, 2016

(65) Prior Publication Data

US 2017/0136646 A1    May 18, 2017

(30) Foreign Application Priority Data

Nov. 13, 2015 (KR) .................. 10-2015-0159599

(51) Int. Cl.
| | |
|---|---|
| *B26D 5/00* | (2006.01) |
| *H04N 5/232* | (2006.01) |
| *H04N 7/18* | (2006.01) |
| *B26D 1/08* | (2006.01) |
| *B26D 5/10* | (2006.01) |

(52) U.S. Cl.
CPC ............ *B26D 5/007* (2013.01); *H04N 5/232* (2013.01); *H04N 7/183* (2013.01); *H04N 7/188* (2013.01); *B26D 1/08* (2013.01); *B26D 5/10* (2013.01)

(58) Field of Classification Search
CPC . B26D 5/007; B26D 5/10; B26D 1/08; H04N 7/183; H04N 7/188; H04N 5/232
USPC .......................................................... 348/86
See application file for complete search history.

(56) References Cited

U.S. PATENT DOCUMENTS

| | | | | |
|---|---|---|---|---|
| 5,107,628 | A | * 4/1992 | Kondo | .................... B24B 13/06 451/10 |
| 8,312,796 | B2 | 11/2012 | Kunkel et al. | |
| 8,462,215 | B2 | 6/2013 | Jang et al. | |
| 2010/0157020 | A1 | 6/2010 | Choi et al. | |
| 2011/0149068 | A1 | 6/2011 | Son et al. | |
| 2014/0016026 | A1* | 1/2014 | Wolfe | ..................... G03B 15/03 348/371 |
| 2014/0195841 | A1* | 7/2014 | Lee | ........................ G06F 1/3206 713/323 |
| 2014/0318342 | A1* | 10/2014 | Koegel | ................ B23D 45/068 83/477.1 |

FOREIGN PATENT DOCUMENTS

| | | |
|---|---|---|
| KR | 10-2010-0067407 A | 6/2010 |
| KR | 10-1321908 B1 | 10/2013 |

* cited by examiner

*Primary Examiner* — Allen C Wong
(74) *Attorney, Agent, or Firm* — William Park & Associates Ltd.

(57) ABSTRACT

Disclosed herein are an apparatus and method for controlling the capture of an image of a cut surface. The apparatus for controlling the capture of an image of the cut surface of material that is cut using a cutting device includes a signal generation unit for outputting a signal, a sensor unit for sensing the output signal using multiple sensors and generating a sensing signal, and an image capture control unit for controlling an image-capturing operation of an imaging device, which captures the image of the cut surface, using the sensing signal.

16 Claims, 6 Drawing Sheets

APPARATUS AND METHOD FOR CONTROLLING CAPTURE OF IMAGE OF CUT SURFACE

CROSS REFERENCE TO RELATED APPLICATION

This application claims the benefit of Korean Patent Application No. 10-2015-0159599, filed Nov. 13, 2015, which is hereby incorporated by reference in its entirety into this application.

BACKGROUND OF THE INVENTION

1. Technical Field

The present invention relates generally to technology for capturing an image of a cut surface of material and, more particularly, to technology for capturing the images of cut surfaces of material by automatically recognizing the cut surfaces of the material, which is consecutively cut using a cutting device.

2. Description of the Related Art

When it is necessary to cut an object or material in order to analyze or observe the object or material or to experiment thereon, various forms of cutting apparatuses may be used. Currently, technology related to cutting apparatuses has been significantly developed, and as a result, an apparatus capable of cutting a slice that is thinner than a strand of hair has been developed.

Generally, when producing a slice from an object or material, mostly, the slice itself is used. However, in the education and image processing fields, an image of a slice, rather than the slice itself, is used in many cases.

Currently widely used apparatuses, such as microtomes or the like, provide a function of cutting material for acquiring slices therefrom but do not provide an automatic image-capturing method for easily capturing images of the cut surfaces when the material is successively sliced. Accordingly, users who want to acquire images of the cut surfaces of material must manually repeat steps of cutting the material and capturing images of the cut surfaces thereof using a camera.

Therefore, it is necessary to develop technology for automatically capturing an image of the cut surface of material by detecting that the material is being cut using a cutting apparatus. Also, urgently required is technology for consecutively capturing the cut surfaces of material that is consecutively cut using a cutting apparatus.

In connection with this, Korean Patent Application Publication No. 10-2010-0067407 discloses a technology related to "Photographing control method and apparatus according to motion of digital photographing apparatus".

SUMMARY OF THE INVENTION

An object of the present invention is to automatically capture an image of the cut surface of material by detecting the movement of a cutting device when the material is being cut using the cutting device.

Also, another object of the present invention is to reduce the amount of time and effort required in order to capture an image of the cut surface of material by automatically sensing and capturing the image of the cut surface of the material that is consecutively cut.

In order to accomplish the above object, an apparatus for controlling capture of an image of a cut surface of material that is cut by a cutting device, according to the present invention, includes a signal generation unit, located at an area within which the cutting device moves, for outputting a signal; a sensor unit for sensing the output signal using multiple sensors and for generating a sensing signal; and an image capture control unit for controlling an image-capturing operation of an imaging device, which captures the image of the cut surface, using the sensing signal.

Here, the image capture control unit may include a sensing signal reception module for setting a state value of the sensor using the sensing signal received from the sensor unit; an operational state control module for creating an image capture instruction using the state value of the sensor; and an image capture signal transmission module for transmitting the created image capture instruction to the imaging device.

Here, the sensing signal reception module may compare a signal level of the sensing signal with a reference value, set the state value of the sensor corresponding to the sensing signal to a standby state when the signal level of the sensing signal is less than the reference value, and set the state value of the sensor corresponding to the sensing signal to a sensing state when the signal level of the sensing signal is equal to or greater than the reference value.

Here, in any one time slot, only a single sensor may have the sensing state as the state value thereof, or there may be no sensor having the sensing state, among the multiple sensors included in the sensor unit.

Here, the reference value may be set for each of the multiple sensors, and the sensing signal reception module may set the state value of the sensor by comparing the signal level of the sensing signal with the reference value for the sensor corresponding to the sensing signal.

Here, when the state value of a first sensor, corresponding to a position at which the material is cut, changes from the standby state to the sensing state, the operational state control module may initialize an operational state of the first sensor to an inactive state and set the operational states of the other sensors, excluding the first sensor, to an image capture preparation state.

Here, when the state value of a second sensor in the image capture preparation state is the sensing state, the image capture instruction may be created, and an operational state of the second sensor may be initialized to the inactive state.

Here, the signal generation unit may output the signal while moving so as to correspond to movement of a blade of the cutting device or movement of the material to be cut.

Here, the apparatus may further include an external input unit for receiving at least one of a number of the sensors included in the sensor unit, identifiers of the sensors, reference values for the respective sensors, and an instruction for initializing an operational state of the sensors.

Here, the material may be cut by being moved up and down so as to correspond to a spindle that moves up and down according to rotation of a worm gear.

Also, a method for controlling capture of an image of a cut surface, performed by an apparatus for controlling capture of an image of a cut surface of material according to an embodiment of the present invention includes outputting a signal in an area within which a cutting device for cutting the material moves; sensing the output signal using multiple sensors and generating a sensing signal; and controlling an image-capturing operation of an imaging device, which captures the image of the cut surface, using the sensing signal.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
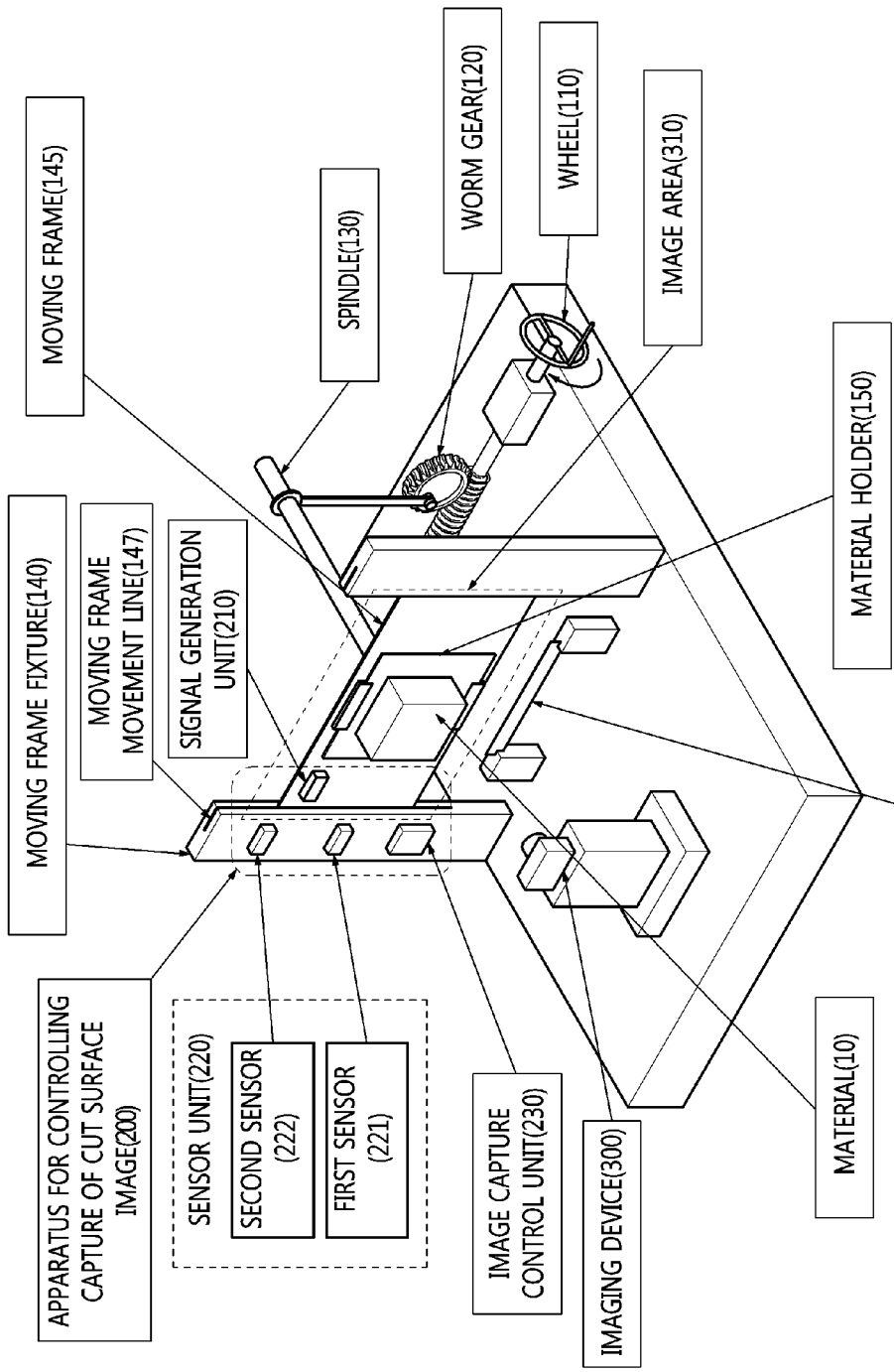
FIG. 1 is a view illustrating a system for controlling the capture of an image of a cut surface according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

FIG. 1 is a view illustrating a system for capturing an image of a cut surface according to an embodiment of the present invention.

As illustrated in FIG. 1, the system for capturing an image of a cut surface is divided into a cutting device, an apparatus for controlling the capture of an image of a cut surface, and an imaging device.

First, the cutting device includes a wheel 110, a worm gear 120, a spindle 130, a moving frame fixture 140, a material holder 150, and a blade 160. When the wheel 110 rotates, the worm gear 120 rotates so as to correspond to the rotation of the wheel 110, and the rotation of the worm gear 120 causes the spindle 130 to move up and down.

Also, a moving frame 145 moves up and down along a moving frame movement line 147 so as to correspond to the up-and-down movement of the spindle 130. Here, the moving frame movement line 147 is determined according to the moving frame fixture 140. Also, the up-and-down movement of the moving frame 145 causes the material 10 held in the material holder 150 to be cut into slices by the blade 160. Here, if the wheel continuously rotates, the moving frame 145 also continuously moves up and down. Accordingly, the material 10 is continuously cut, whereby consecutive slices may be generated.

Also, the apparatus 200 for controlling the capture of an image of a cut surface includes a signal generation unit 210, a sensor unit 220, and an image capture control unit 230. The signal generation unit 210 is installed in the moving frame 145. Also, a first sensor 221 and a second sensor 222, included in the sensor unit 220, are installed in the moving frame fixture 140.

When the signal generation unit 210 moves up and down along with the moving frame 145, the sensors 221 and 222 of the sensor unit 220 sense the signal output from the signal generation unit 210 and thereby generate a sensing signal.

For example, when the signal generation unit 210, which moves along the moving frame movement line 147, is located in the area corresponding to the first sensor 221, the first sensor 221 senses the signal output from the signal generation unit 210 and thereby generates a sensing signal. In this case, the second sensor 222 may not sense the signal output from the signal generation unit 210, or, if a signal is sensed, the intensity thereof may be much weaker than the intensity of the signal sensed by the first sensor 221.

Also, when the signal generation unit 210, installed in the moving frame 145, is located in the area corresponding to the second sensor 222 by moving along the moving frame movement line 147, the second sensor 222 generates a sensing signal by sensing the signal output from the signal generation unit 210, as in the first sensor 221.

For the convenience of description, the sensor unit 220 is described as including the two sensors 221 and 222, but without limitation thereto, the sensor unit 220 may include multiple sensors.

Also, the image capture control unit 230 controls the operation of the imaging device 300 using the sensing signal received from the sensor unit 220. Here, the image capture control unit 230 may send the imaging device 300 a signal for controlling the operation thereof in a wired or wireless manner.

Meanwhile, the imaging device 300 is installed such that the lens thereof faces the cut surface of the material 10 and captures the image of the cut surface of the material under the control of the apparatus 200 for controlling the capture of an image of a cut surface.

The image area 310 of the imaging device 300 includes all of the area within which the material 10 moves up and down, or includes the area corresponding to the size of the cut surface of the material 10. If the image area 310 of the imaging device 300 includes the area corresponding to the size of the cut surface of the material 10, the imaging device 300 may receive an image capture instruction signal, which instructs the imaging device 300 to move so as to face the material 10 and to capture the image of the cut surface of the material 10, from the image capture control unit 230, and may thereby capture the cut surface of the material 10.

Figure 2:
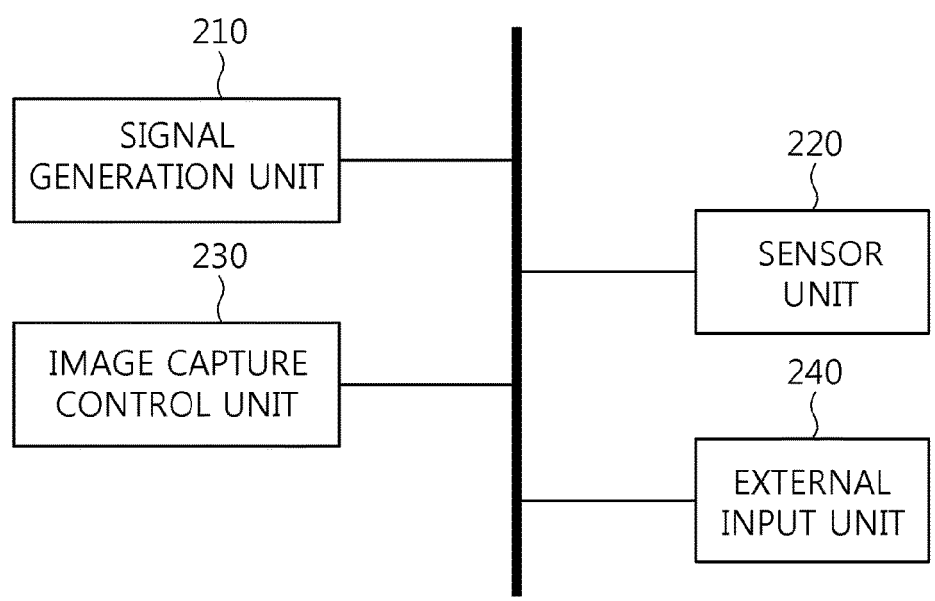
FIG. 2 is a block diagram illustrating the configuration of an apparatus for controlling the capture of an image of a cut surface according to an embodiment of the present invention.

FIG. 2 is a block diagram illustrating the configuration of an apparatus for controlling the capture of an image of a cut surface according to an embodiment of the present invention.

As illustrated in FIG. 2, the apparatus 200 for controlling the capture of an image of a cut surface includes a signal generation unit 210, a sensor unit 220, an image capture control unit 230, and an external input unit 240.

First, the signal generation unit 210 is installed in the moving frame of a cutting device. The signal generation unit 210 outputs a signal while moving along the moving frame movement line, which faces the line on which the sensors of the sensor unit 220 are arranged. When the cutting device consecutively produces slices from the material, the signal generation unit 210 outputs signals while repeatedly moving up and down along the moving frame movement line within the range within which the cutting device moves.

Here, the signal output by the signal generation unit 210 is a substance having a property that can be sensed by the sensor of the sensor unit 220, or is a signal sensible by the sensor, and the signal generation unit 210 generates an external stimulus of which the state, the characteristics, or the amount may be detected or measured by the sensor.

For the convenience of description, the signal generation unit 210 is described as being installed in the moving frame and moving so as to correspond to the movement of the material, but without limitation thereto, the signal generation unit 210 may move so as to correspond to the movement of the blade of the cutting device and output a signal.

Also, the sensor unit 220 generates a sensing signal by sensing the signal output from the signal generation unit 210. The sensor unit 220 includes multiple sensors. Here, the first sensor included in the sensor unit 220 may be installed at a position corresponding to the area at which the material is cut by the blade of the cutting device and a slice is produced, and the second sensor may be installed at a position corresponding to the area at which the blade moves apart from the material, so that there is no obstruction when the imaging device 300 captures the image of the cut surface of the material.

When the signal generation unit 210 passes a sensing point corresponding to the position of the sensor, the sensor unit 220 senses the signal output from the signal generation unit 210 using the sensor, which is arranged so as to be close to the moving frame movement line. For example, when the sensor unit 220 includes two sensors, the sensing point of the first sensor may be position_1, and the sensing point of the second sensor may be position_2.

The kind of sensors included in the sensor unit 220 is determined depending on the signal generation unit 210, or the signal generation unit 210 is determined depending on the kind of sensor. In other words, the kind of sensors included in the sensor unit 220 may be determined based on the properties of the substance or on the signal output from the signal generation unit 210. Alternatively, the signal generation unit 210 may be determined based on the properties or signal sensible by the sensor included in the sensor unit 220.

For example, if the sensor is an electromagnetic sensor, the signal generation unit 210 may be a device capable of outputting an electric wave, a magnetic wave, or an electromagnetic wave so as to make a one-to-one correspondence between the signal generation unit 210 and the sensor. Also, if the sensor is a magnetic sensor, the signal generation unit 210 may be a device that outputs magnetic force. Also, if the sensor is an optical sensor, the signal generation unit 210 may output visible light, infrared light, ultraviolet light or the like.

Next, the image capture control unit 230 controls the operation of the imaging device, which is installed so as to capture an image of the cut surface of material, using a sensing signal. The image capture control unit 230 sets the state value of the sensor corresponding to the sensing signal using the sensing signal received from the sensor unit 220. Then, the image capture control unit 230 creates an image capture instruction using the set state value of the sensor. Also, the image capture control unit 230 sends the created image capture instruction to the imaging device, and thereby controls the imaging device so as to make the imaging device capture the image of the cut surface of the material.

The image capture control unit 230 compares the signal level of the sensing signal with a reference value. Here, if the signal level of the sensing signal is less than the reference value, the state value of the sensor corresponding to the sensing signal is set to a standby state. Conversely, if the signal level of the sensing signal is equal to or greater than the reference value, the state value of the sensor corresponding to the sensing signal is set to a sensing state.

Here, the reference value may be set individually for each of the sensors. The image capture control unit 230 compares the signal level of the sensing signal with the reference value for the sensor corresponding to the sensing signal, and thereby sets the state value of the corresponding sensor.

Also, when the state value of the first sensor, which corresponds to the position at which the material is cut, changes from a standby state to a sensing state, the image capture control unit 230 initializes the operational state of the first sensor to an inactive state and sets the operational states of the other sensors, excluding the first sensor, to an image capture preparation state. In a single time slot, only a single sensor has a sensing state as the state value thereof, or there may be no sensor having a sensing state, among the multiple sensors included in the sensor unit 220.

Also, if the state value of the second sensor in an image capture preparation state is a sensing state, the image capture control unit 230 creates an image capture instruction and initializes the operational state of the second sensor to an inactive state.

Finally, the external input unit 240 may receive sensor configuration information CONFIG that includes at least one of the number of sensors included in the sensor unit 220, the identifier SID of each of the sensors, and a reference value L for each of the sensors. Also, the external input unit 240 may receive a RESET configuration value, which corresponds to the instruction for initializing the operational state of the sensor.

Here, the sensor configuration information CONFIG may have a format configured as (the number of sensors N, <sensor SID=1, reference value $L_1$>, . . . , <sensor SID=N, reference value $L_N$>), or (the number of sensors N, <reference value L1>, . . . , <reference value LN>), and the sensor configuration information may be used to initialize and reconfigure the internal storage or variables. Also, when the external input unit 240 receives a RESET configuration value, the operational state of a sensor may be reconfigured by initializing it to an inactive state.

In particular, the identifier SID of each of the sensors included in the sensor unit 220 may be a value input from a user through the external input unit 240, or may be automatically assigned by the external input unit 240 based on the number of input sensors or a reference value.

Hereinafter, a method for controlling the capture of an image of a cut surface using an apparatus for controlling the capture of an image of a cut surface according to an embodiment of the present invention will be described in detail with reference to FIGS. 3 to 6.

Figure 3:
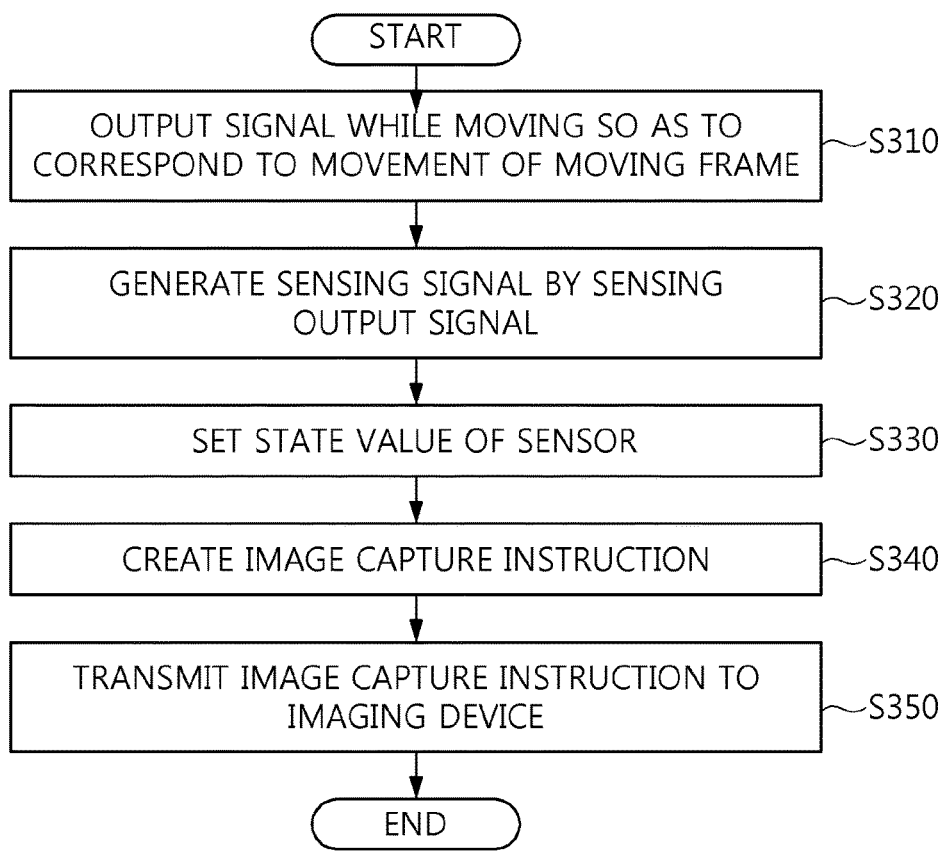
FIG. 3 is a flowchart illustrating a method for controlling the capture of an image of a cut surface according to an embodiment of the present invention.
Figure 4:
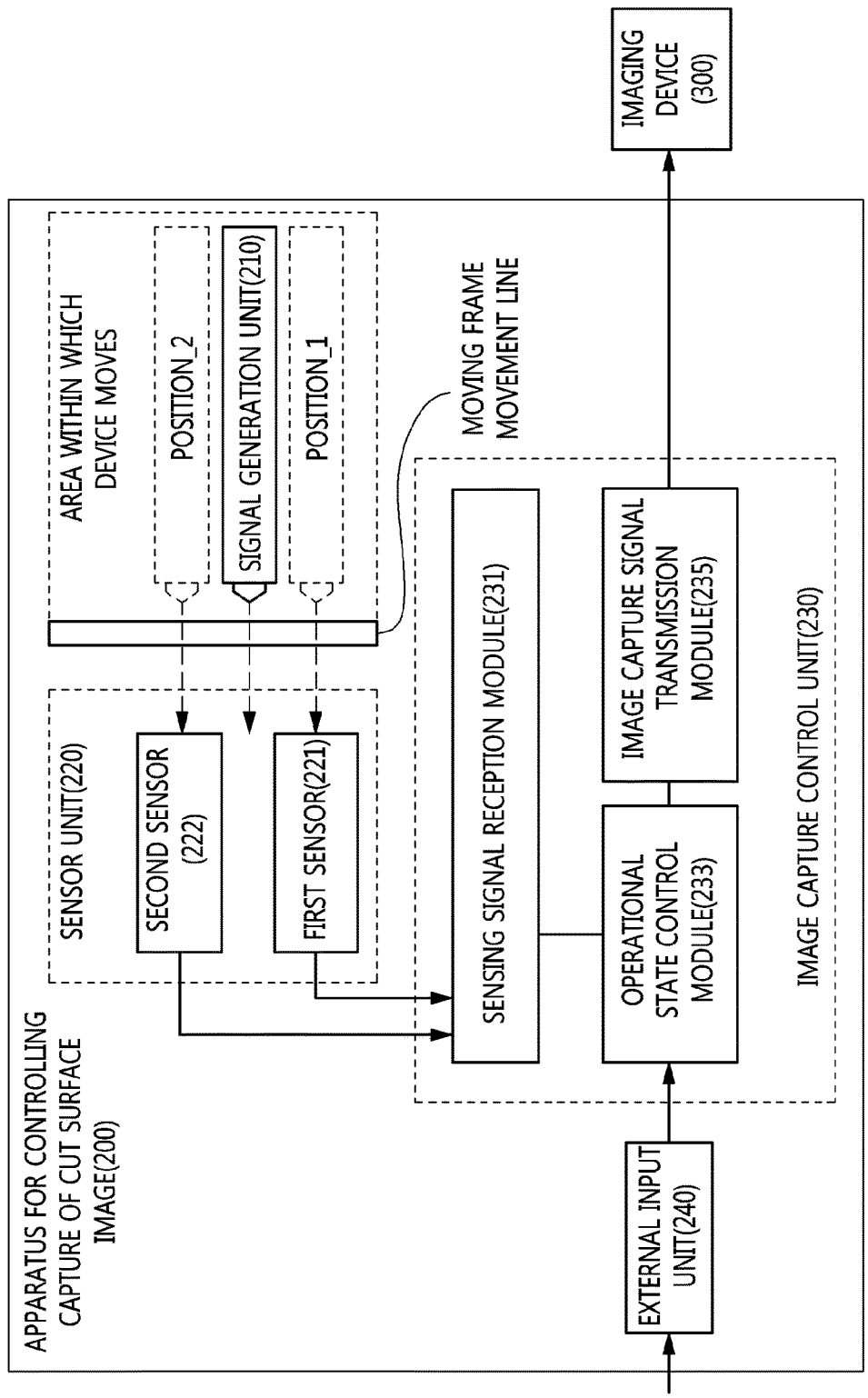
FIG. 4 is a view for describing the components of an apparatus for controlling the capture of an image of a cut surface according to an embodiment of the present invention.

FIG. 3 is a flowchart illustrating a method for controlling the capture of an image of a cut surface according to an embodiment of the present invention, and FIG. 4 is a view for describing the components of an apparatus for controlling the capture of an image of a cut surface according to an embodiment of the present invention.

First, an apparatus 200 for controlling the capture of an image of a cut surface outputs a signal at step S310 while moving so as to correspond to the movement of a moving frame.

The apparatus 200 for controlling the capture of an image of a cut surface may output a signal through a signal generation unit 210. The signal generation unit 210 may be implemented in the form of being installed in the moving frame, and may output a signal while moving along a moving frame movement line between position_1 and position_2 within a device motion area. Also, the material to be cut also moves up and down together with the movement of the moving frame, and is cut by a blade.

The signal output from the signal generation unit 210 at step S310 may be configured differently depending on the kind of sensors included in the sensor unit 220. For example, if the sensor of the sensor unit 210 is an optical sensor, the signal generation unit 210 may output visible light, infrared light, ultraviolet light or the like.

Also, the apparatus 200 for controlling the capture of an image of a cut surface generates a sensing signal at step S320 by sensing the signal output at step S310.

The apparatus 200 for controlling the capture of an image of a cut surface senses the output signal using one or more sensors included in the sensor unit 220. In particular, when the sensor unit 220 includes two sensors, the first sensor 221 may be installed at position_1, and the second sensor 222 may be installed at position_2. Also, when the sensor unit 220 includes three or more sensors, the additional sensors are installed between the first sensor and the second sensor, whereby the imaging device 300 may be implemented so as to capture as many images of the cut surfaces of material as the number of the sensors.

As illustrated in FIG. 4, when the sensor unit 220 includes the first sensor 221 and the second sensor 222, the first sensor 221 may be installed at the position corresponding to position_1, and the second sensor 222 may be installed at the position corresponding to position_2.

Here, position_1 indicates the position at which the material is cut by the blade installed in the lower part when the material is moved downwards due to the movement of the moving frame. Also, position_2 indicates the position at which the imaging device 300 may capture the image of the cut surface of the material because the material is moved upwards due to the movement of the moving frame.

Next, the apparatus 200 for controlling the capture of an image of a cut surface sets the state value of a sensor using the sensing signal at step S330.

The apparatus 200 for controlling the capture of an image of a cut surface compares the signal level of the sensing signal with a reference value through the image capture control unit 230. Then, the image capture control unit 230 sets the state value of the sensor depending on the result of the comparison of the signal level of the sensing signal with the reference value.

Figure 5:
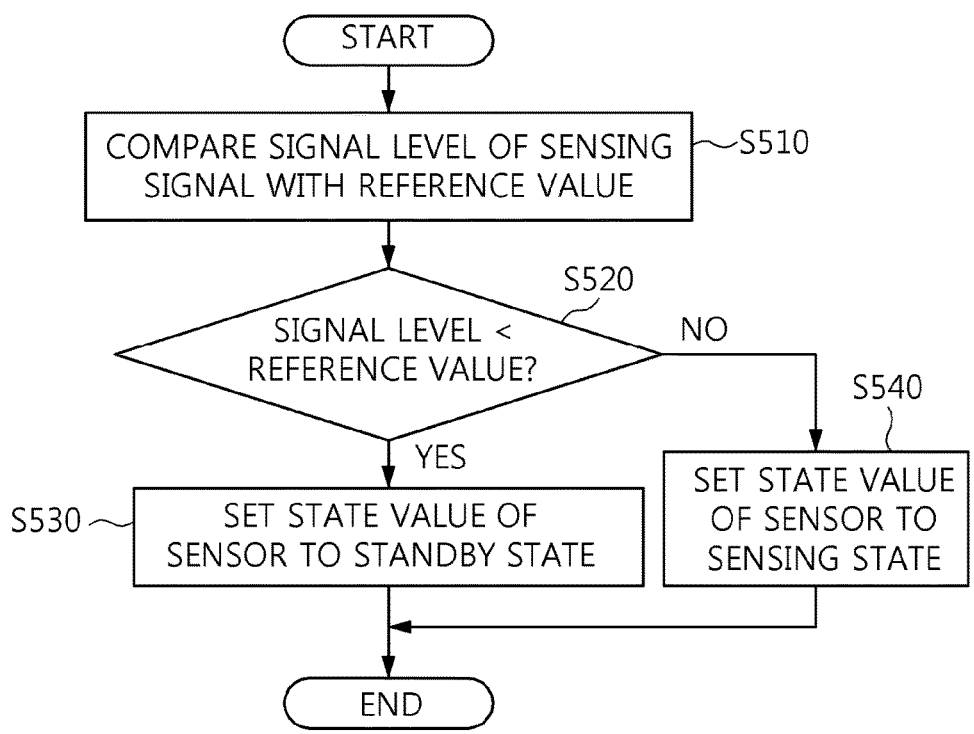
FIG. 5 is a view for describing step S330 of FIG. 3.

FIG. 5 is a view for describing step S330 of FIG. 3.

As shown in FIG. 5, the image capture control unit 230 compares the signal level of the sensing signal with a reference value at step S510, and determines whether the signal level of the sensing signal is less than the reference value at step S520.

When it is determined that the signal level of the sensing signal is less than the reference value, the image capture control unit 230 sets the state value of the sensor corresponding to the sensing signal to a standby state at step S530.

Conversely, when it is determined that the signal level of the sensing signal is equal to or greater than the reference value, the image capture control unit 230 sets the state value of the sensor corresponding to the sensing signal to a sensing state at step S540.

Here, in a single time slot, only a single sensor may have a sensing state as the state value thereof, or there may be no sensor having a sensing state, among the multiple sensors included in the sensor unit. If the signal generation unit 210 outputs a signal at the position corresponding to a certain sensor, there may be only one sensor having a sensing state as the state value thereof. However, when the signal generation unit 210 outputs a signal halfway between two sensors included in the sensor unit 220, because the sensors may not sense the output signal, the state values of all the sensors may be set to a standby state, whereby no sensor having a sensing state may exist.

The image capture control unit 230 may store a signal level reference value and an operational state for each of the sensors in the internal storage, as shown in Table 1.

TABLE 1

| Sensor ID (SID) | 1 | 2 | ... | n |
| Signal level reference value (SL) | L1 | L2 | ... | Ln |
| State value (CV) | V1 | V2 | ... | Vn |
| Operational state (ST) | 0 | R | ... | R |

As shown in Table 1, the image capture control unit 230 stores the signal level reference value SL, the state value CV, and the operational state ST for each sensor ID SID. The multiple sensors included in the sensor unit 220 may be set so as to have the same signal level reference value SL, but without limitation thereto, the sensors may have different signal level reference values SL. Here, the signal level reference value SL may be input through the external input unit 240.

The state value of each of the sensors may be represented as 0, which indicates a standby state, or as 1, which indicates a sensing state. Also, the operational state ST may be represented as 0, which indicates an inactive state, or as R, which indicates an image capture preparation state.

As illustrated in FIG. 3, the apparatus 200 for controlling the capture of an image of a cut surface creates an image capture instruction using the state value of the sensor at step S340. Then, the image capture control unit 230 of the apparatus 200 for controlling the capture of an image of a cut surface sends the created image capture instruction to the imaging device 300 at step S350.

Figure 6:
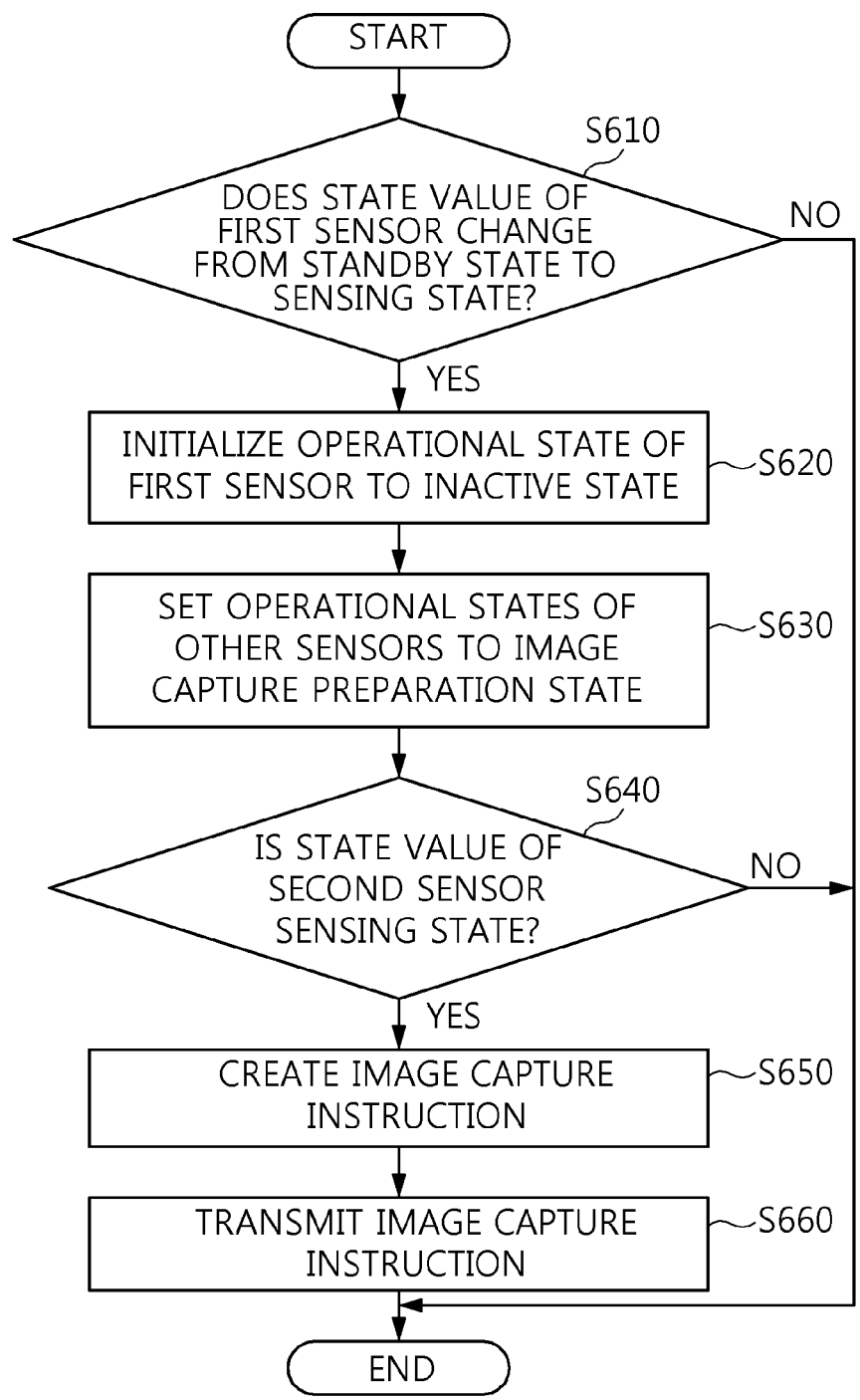
FIG. 6 is a view for describing step S340 of FIG. 3.

FIG. 6 is a view for describing step S340 of FIG. 3.

As illustrated in FIG. 6, the image capture control unit 230 of the apparatus 200 for controlling the capture of an image of a cut surface determines whether the state value of the first sensor changes from a standby state to a sensing state at step S610. Here, if the state value of the first sensor maintains the standby state, the image capture control unit 230 does not create an image capture instruction.

Conversely, if the state value of the first sensor changes from the standby state to a sensing state, the image capture control unit 230 initializes the operational state of the first sensor to an inactive state at step S620.

Then, the image capture control unit 230 sets the operational states of the remaining sensors, excluding the first sensor, to an image capture preparation state at step S630.

Also, the image capture control unit 230 determines whether the state value of the second sensor is a sensing state at step S640. Here, if the state value of the second sensor is a standby state, the image capture control unit 230 does not perform the steps of creating an image capture instruction and sending the image capture instruction to the imaging device 300, which will be described below.

If the state value of the second sensor is a sensing state, the image capture control unit 230 creates an image capture instruction at step S650 and sends the image capture instruction to the imaging device 300 at step S660.

The following pseudo code 1 shows an example of the process in which the image capture control unit creates an image capture instruction using the state value of the sensor.

[Pseudo code 1]

```
1) When (sensor SID == 1, state value CV == sensing state) is
received,
    Set sensor(1).ST = 0, and other sensors(2, 3, ..., n).ST = R (image
capture preparation state)
2) When (sensor SID == 2, state value CV == sensing state) is
received,
    If (sensor(2).ST == R)
        create and send image capture instruction,
        update sensor(2).ST = 0
    Else
        Ignore (void) /* call Ignore( ) function*/
```

As shown in pseudo code 1, when the state value CV of the first sensor, the SID of which is 1 (SID==1), is a sensing state, the image capture control unit 230 sets the operational state of the first sensor to an inactive state (sensor(1).ST=0) and sets the operational states of all the remaining sensors (the second sensor to the n-th sensor), excluding the first sensor, to an image capture preparation state (ST=R).

Also, when the state value CV of the second sensor, the SID of which is 2 (SID==2), is a sensing state, if the operational state of the second sensor is an image capture preparation state (sensor(2).ST==R), an image capture instruction is created and sent to the imaging device 300, and the operational state of the second sensor is updated to an inactive state (sensor(2).ST=0). Conversely, if the operational state of the second sensor is an inactive state, the image capture control unit 230 does not create an image capture instruction.

Also, the image capture control unit 230 may create an image capture instruction without using the state value of a sensor.

According to the present invention, the movement of a cutting device for cutting material is detected, whereby the image of the cut surface of the material is automatically captured when the material is cut.

Also, according to the present invention, the images of the cut surfaces of material that is consecutively cut may be captured by automatically detecting the cut surfaces, whereby the amount of time and effort required in order to capture the image of the cut surface of the material may be reduced.

As described above, the apparatus and method for controlling the capture of an image of a cut surface according to the present invention are not limitedly applied to the configurations and operations of the above-described embodiments, but all or some of the embodiments may be selectively combined and configured so that the embodiments may be modified in various ways.

What is claimed is:

1. An apparatus for controlling capture of an image of a cut surface of material that is cut by a cutting device, comprising:
   a signal generation unit, located at an area within which the cutting device moves, for outputting a signal;
   a sensor unit for sensing the output signal using multiple sensors and for generating a sensing signal; and
   an image capture control unit for controlling an image-capturing operation of an imaging device, which captures the image of the cut surface, using the sensing signal,
   wherein each of the multiple sensors are configured to change from a standby state to a sensing state,
   wherein the image capture control unit comprises:
       a sensing signal reception module for receiving the sensing signal from the sensor unit;
       an operational state control module for creating an image capture instruction using the sensing signal of the sensor; and
       an image capture signal transmission module for transmitting the created image capture instruction to the imaging device, and
   wherein the sensing signal reception module compares a signal level of the sensing signal with a reference value, sets a state value of the sensor corresponding to the sensing signal to the standby state when the signal level of the sensing signal is less than the reference value, and sets the state value of the sensor corresponding to the sensing signal to the sensing state when the signal level of the sensing signal is equal to or greater than the reference value.

2. The apparatus of claim 1, wherein in any one time slot, only a single sensor has the sensing state as the state value thereof, or there is no sensor having the sensing state, among the multiple sensors included in the sensor unit.

3. The apparatus of claim 1, wherein: the reference value is set for each of the multiple sensors, and the sensing signal reception module sets the state value of the sensor by comparing the signal level of the sensing signal with the reference value for the sensor corresponding to the sensing signal.

4. The apparatus of claim 1, wherein when the state value of a first sensor, corresponding to a position at which the material is cut, changes from the standby state to the sensing state, the operational state control module initializes an operational state of the first sensor to an inactive state and sets the operational states of the other sensors, excluding the first sensor, to an image capture preparation state.

5. The apparatus of claim 4, wherein when the state value of a second sensor in the image capture preparation state is the sensing state, the image capture instruction is created, and an operational state of the second sensor is initialized to the inactive state.

6. The apparatus of claim 1, wherein the signal generation unit outputs the signal while moving so as to correspond to movement of a blade of the cutting device or movement of the material to be cut.

7. The apparatus of claim 1, further comprising: an external input unit for receiving at least one of a number of the sensors included in the sensor unit, identifiers of the sensors, reference values for the respective sensors, and an instruction for initializing an operational state of the sensors.

8. The apparatus of claim 1, wherein the material is cut by being moved up and down so as to correspond to a spindle that moves up and down according to rotation of a worm gear.

9. A method for controlling capture of an image of a cut surface, performed by an apparatus for controlling capture of an image of a cut surface of material, comprising:
   outputting a signal in an area within which a cutting device for cutting the material moves;
   sensing the output signal using multiple sensors and generating a sensing signal; and
   controlling an image-capturing operation of an imaging device, which captures the image of the cut surface, using the sensing signal,
   wherein each of the multiple sensors are configured to change from a standby state to a sensing state,
   wherein controlling the image-capturing operation of the imaging device comprises:
       setting a state value of the sensor using the sensing signal;

creating an image capture instruction using the state value of the sensor; and transmitting the created image capture instruction to the imaging device, and wherein setting the state value of the sensor comprises:

comparing a signal level of the sensing signal with a reference value; and setting the state value of the sensor corresponding to the sensing signal to the standby state when the signal level of the sensing signal is less than the reference value, and setting the state value of the sensor corresponding to the sensing signal to the sensing state when the signal level of the sensing signal is equal to or greater than the reference value.

10. The method of claim 9, wherein in any one time slot, only a single sensor has the sensing state as the state value thereof, or there is no sensor having the sensing state, among the multiple sensors.

11. The method of claim 9, wherein: the reference value is set for each of the multiple sensors, and setting the state value of the sensor is configured to set the state value of the sensor by comparing the signal level of the sensing signal with the reference value for the sensor corresponding to the sensing signal.

12. The method of claim 9, wherein creating the image capture instruction comprises:

when the state value of a first sensor, corresponding to a position at which the material is cut, changes from the standby state to the sensing state, initializing an operational state of the first sensor to an inactive state; and setting the operational states of the other sensors, excluding the first sensor, to an image capture preparation state.

13. The method of claim 12, wherein when the state value of a second sensor in the image capture preparation state is the sensing state, the image capture instruction is created, and an operational state of the second sensor is initialized to the inactive state.

14. The method of claim 9, wherein outputting the signal is configured such that the signal is output at a position corresponding to movement of a blade of the cutting device or movement of the material to be cut.

15. The method of claim 9, further comprising: receiving at least one of a number of the sensors for sensing the signal, identifiers of the sensors, reference values for the respective sensors, and an instruction for initializing an operational state of the sensors.

16. The method of claim 9, wherein the material is cut by being moved up and down so as to correspond to a spindle that moves up and down according to rotation of a worm gear.

* * * * *